United States Patent [19]

Tisue et al.

[11] 4,084,196

[45] Apr. 11, 1978

[54] ELECTRONIC HALF-TONE GENERATING MEANS FOR FACSIMILE REPRODUCTION SYSTEM

[75] Inventors: James G. Tisue, Mountain View; Donald R. Weber, Santa Clara; Peter A. Johanson, Los Altos, all of Calif.

[73] Assignee: Dacom, Inc., Santa Clara, Calif.

[21] Appl. No.: 763,921

[22] Filed: Jan. 31, 1977

[51] Int. Cl.² .............................................. H04N 1/40
[52] U.S. Cl. ................................... 358/283; 358/280
[58] Field of Search ................ 358/283, 284, 280, 282

[56] References Cited

U.S. PATENT DOCUMENTS

| 3,613,103 | 10/1971 | Harris | 358/284 |
|---|---|---|---|
| 3,977,007 | 8/1976 | Berry | 358/283 |
| 4,032,978 | 6/1977 | Wong | 358/283 |
| 4,040,094 | 8/1977 | Everett | 358/283 |

Primary Examiner—Howard W. Britton
Attorney, Agent, or Firm—Boone, Schatzel, Hamrick & Knudsen

[57] ABSTRACT

An electronic half-tone generating circuit for enabling a black and white facsimile transmission system to accurately and efficiently transmit and reproduce images including shades of grey as well as black and white and including an integrator responsive to a first data signal and operative to integrate the difference between an input analog signal and a first reference potential to develop a first integral signal commensurate therewith, and responsive to a second data signal and operative to integrate the difference between the input analog signal and a second reference signal to develop a second integral signal commensurate therewith, a comparator responsive to the first and second integral signals and operative to develop a comparison signal when the first and second integral signals exceed a predetermined threshold value, and a signal generator responsive to the comparison signal and operative to develop the first data signal upon each odd numbered occurrence of the comparison signal and to develop the second data signal upon each even numbered occurrence of the comparison signal. The data signals are comprised of a series of data bits each of which identifies the data state of a discrete elemental area of the scanned information. Also disclosed are a screened version in which mezzo data is converted to a particular format for transmission, and a hybrid version in which mezzo system elements are used alternately with screened system elements to produce a reproduction having optimum picture quality.

24 Claims, 22 Drawing Figures

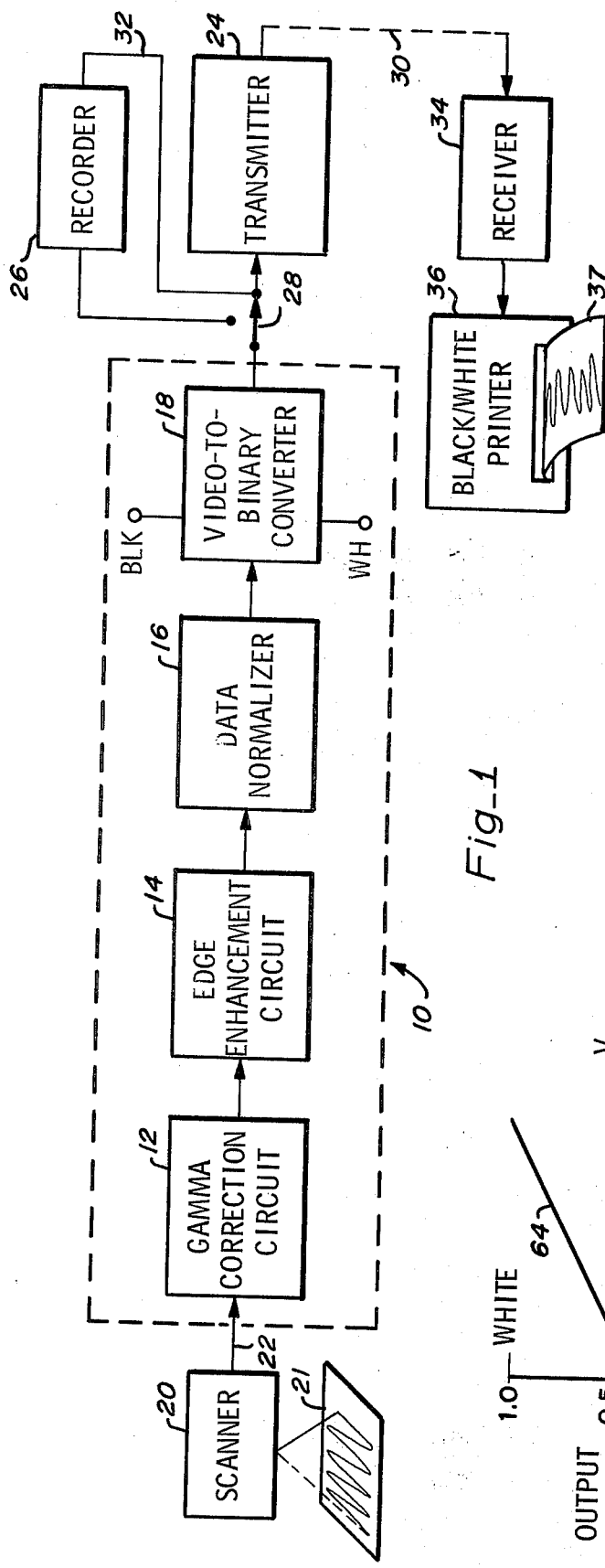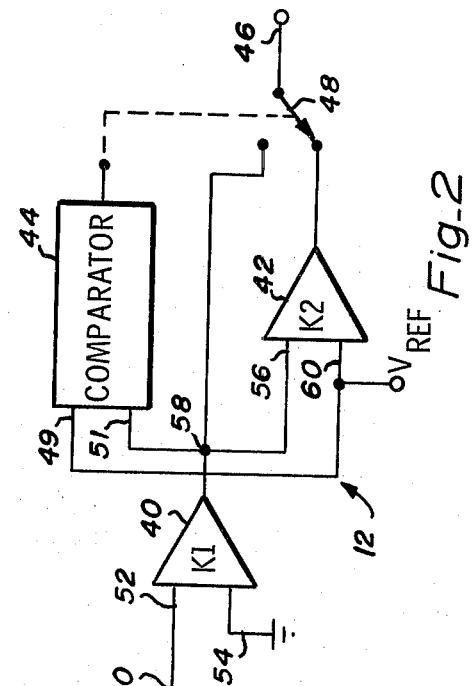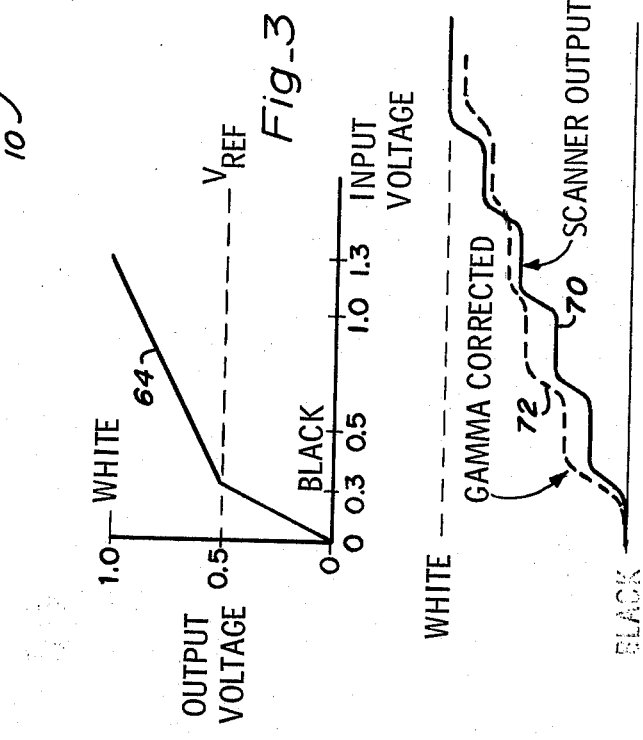

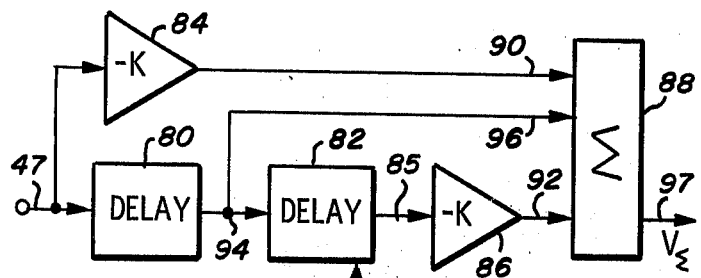
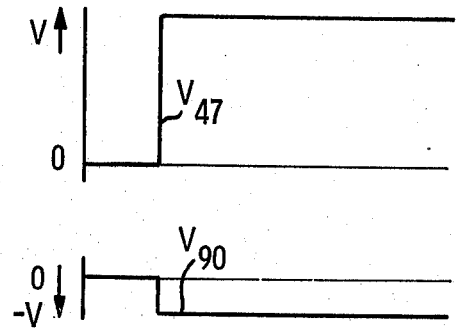
Fig. 5
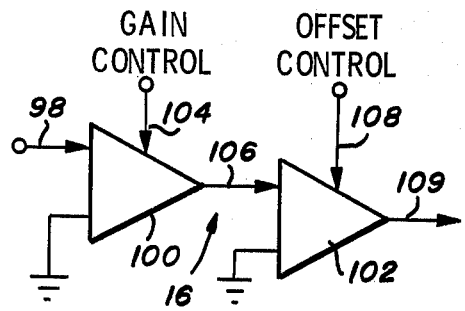
Fig. 7
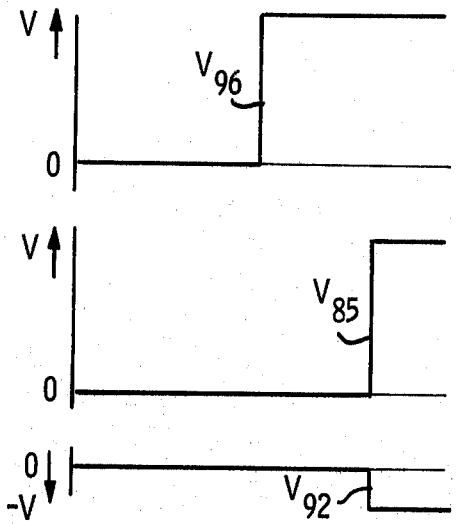
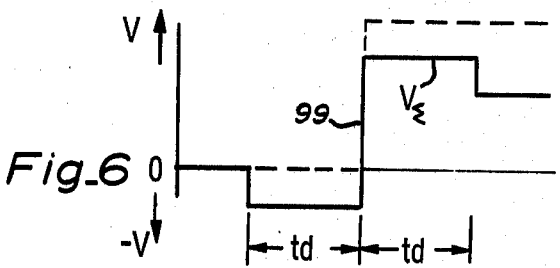
Fig. 6
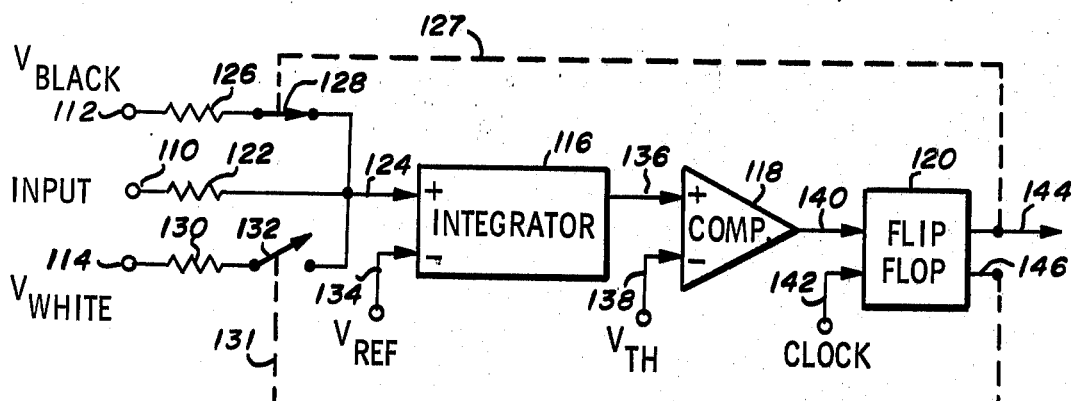
Fig. 8

Fig_9

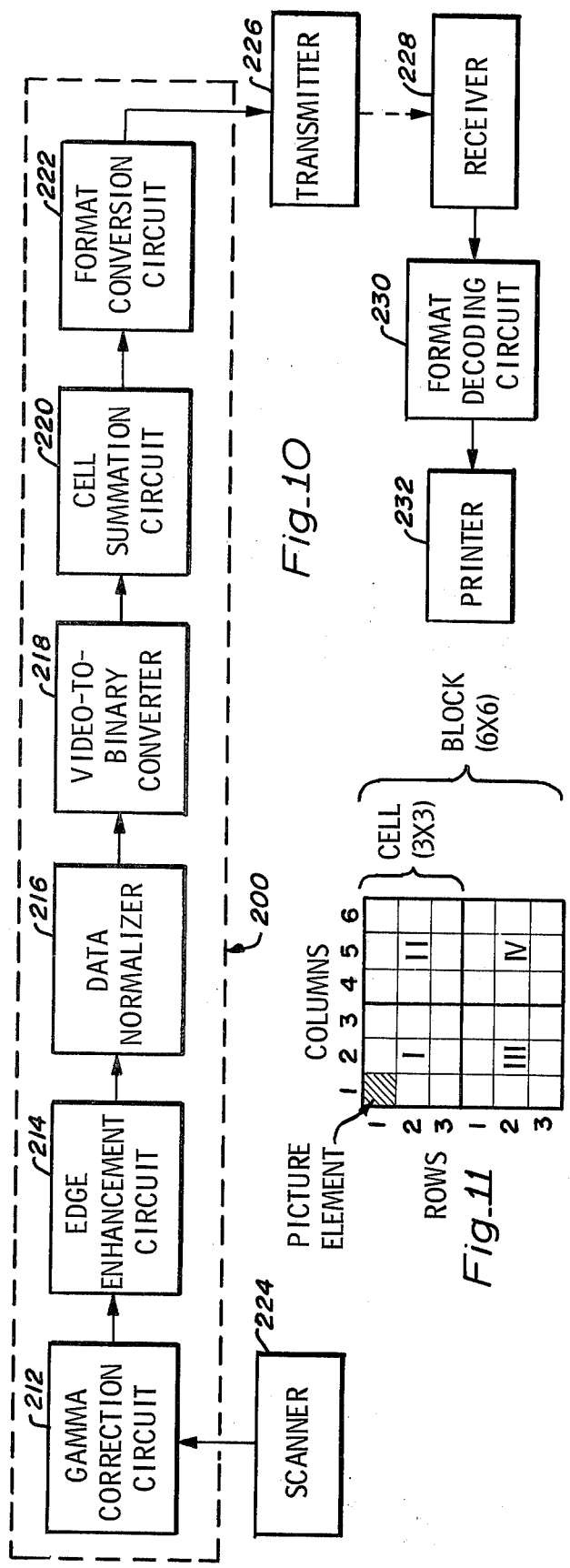
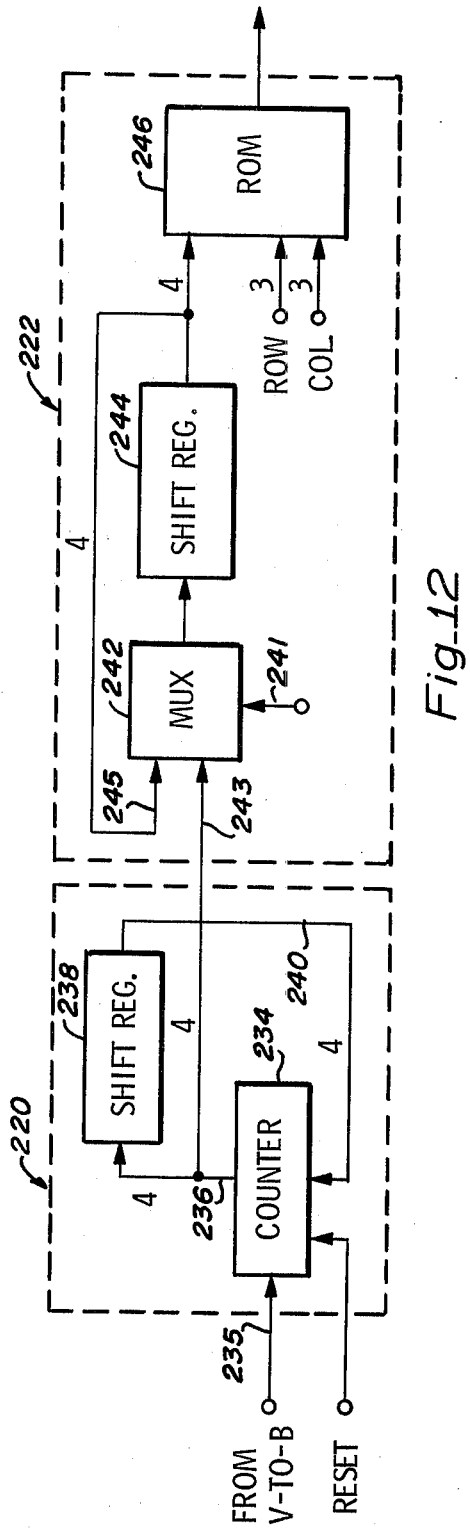
Fig. 10
Fig. 11
Fig. 12

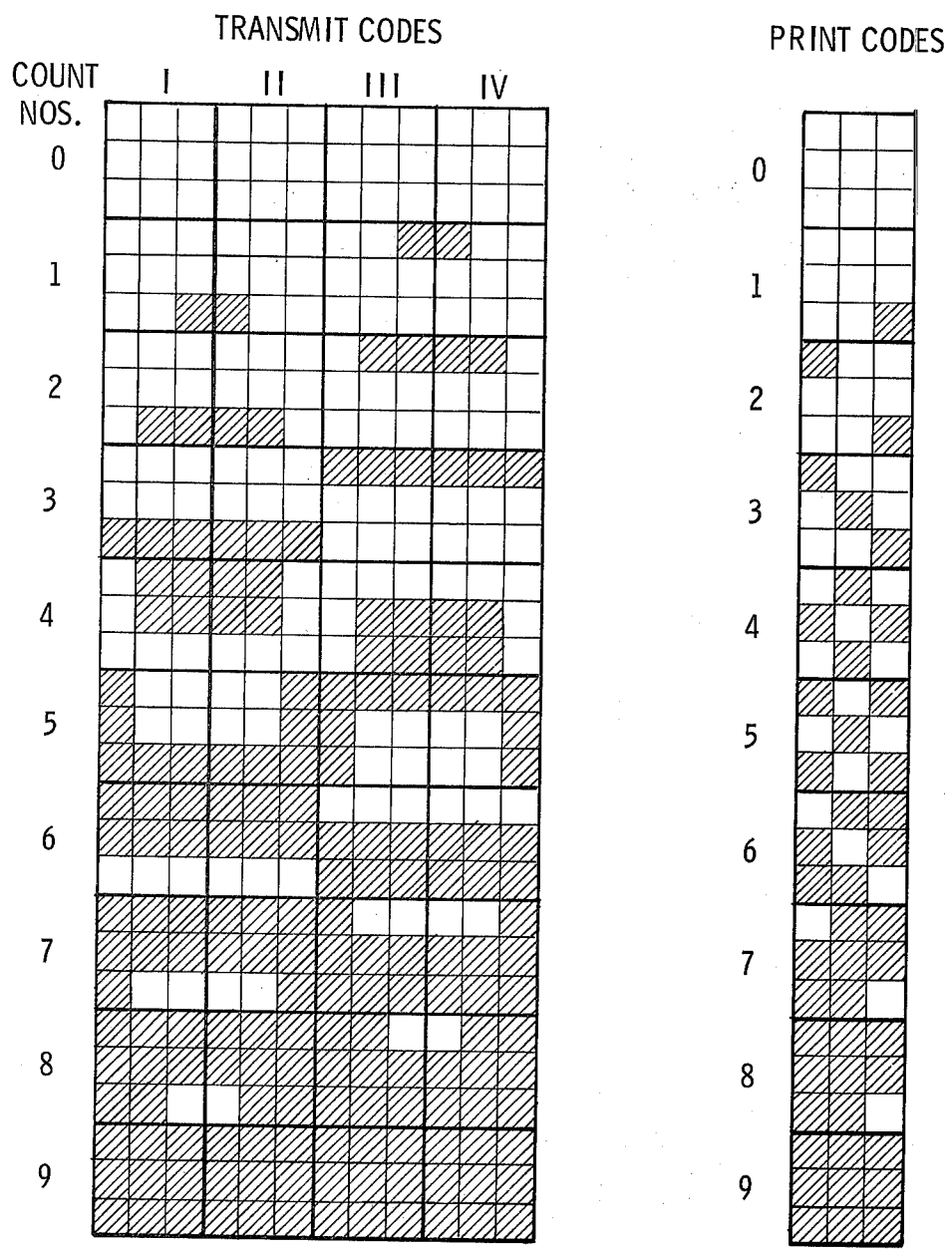
Fig_13  Fig_14

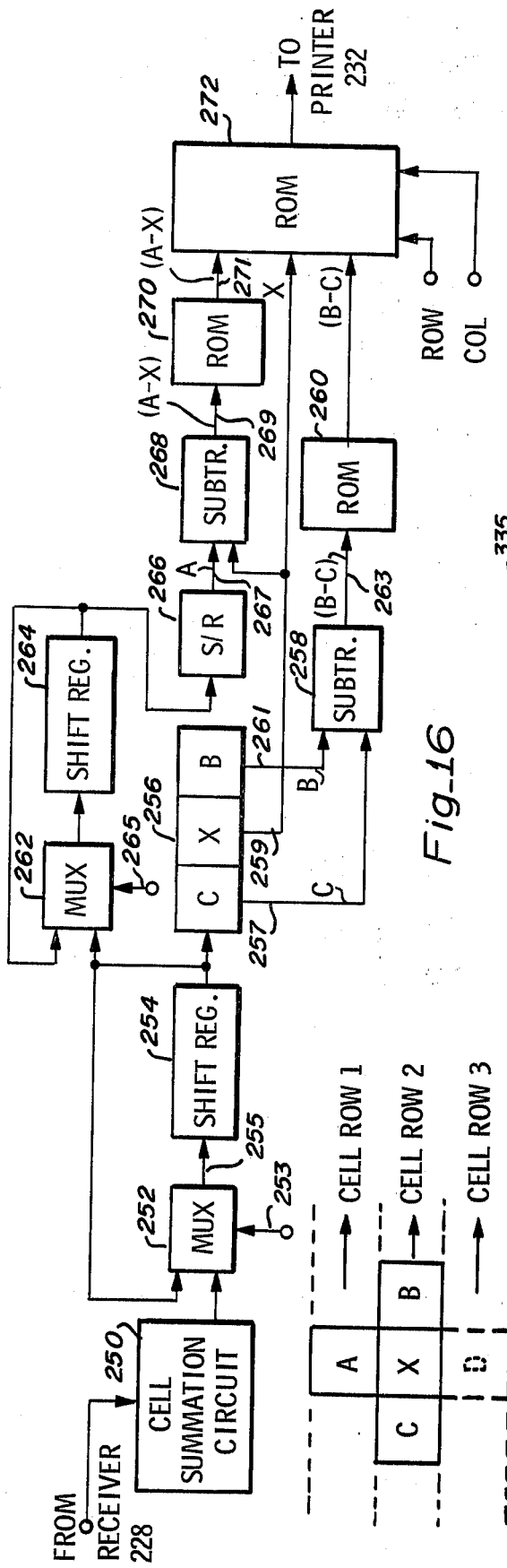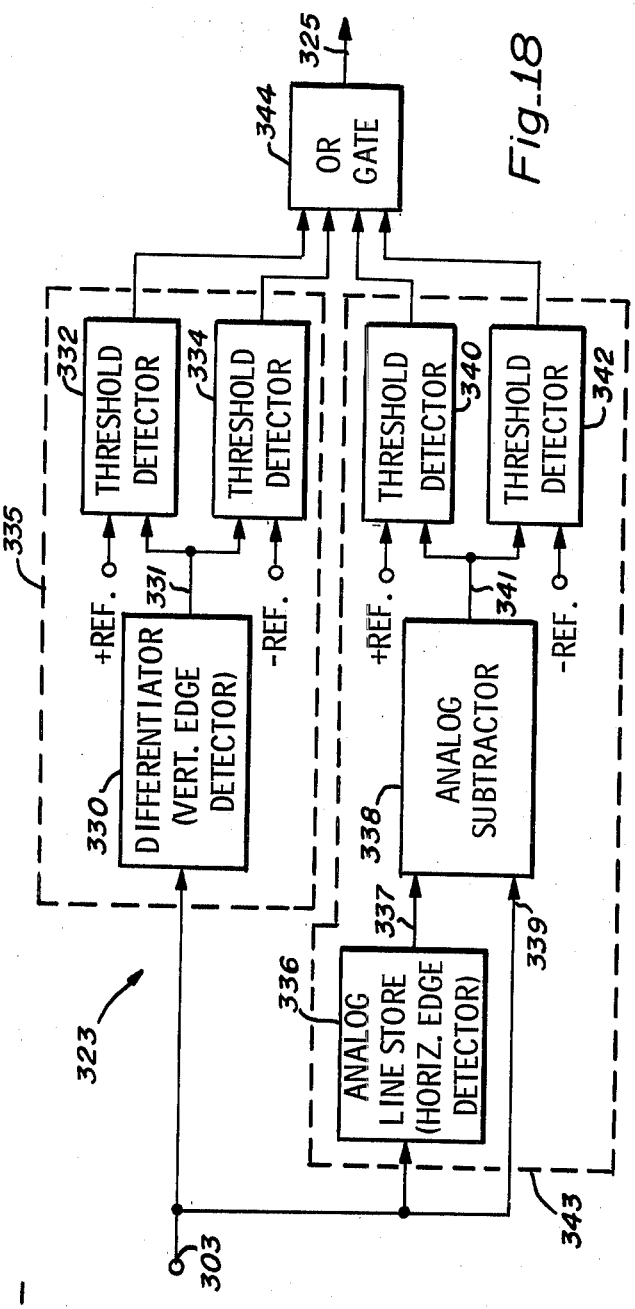
Fig. 16
Fig. 15
Fig. 18

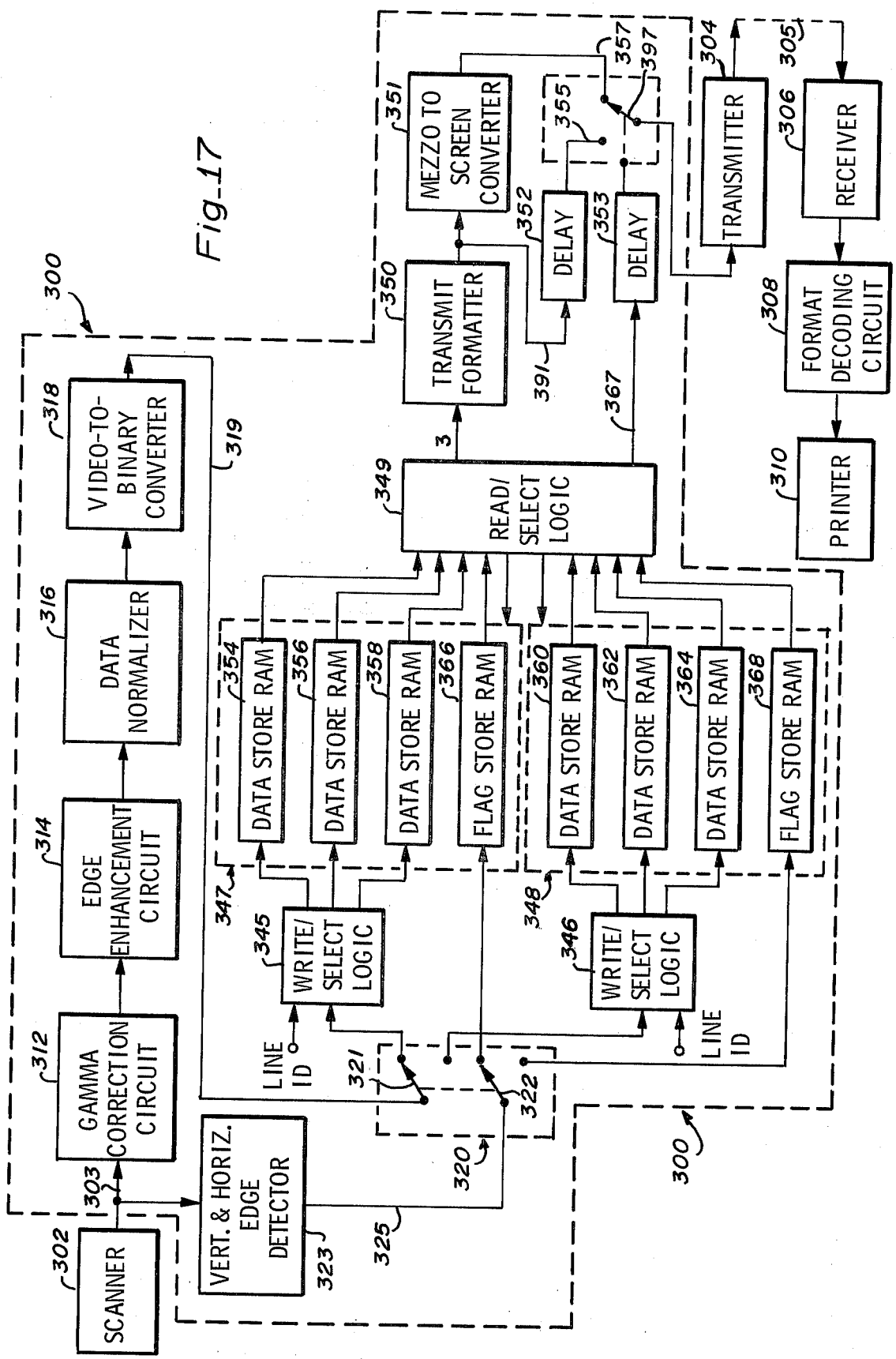

ELECTRONIC HALF-TONE GENERATING MEANS FOR FACSIMILE REPRODUCTION SYSTEM

BACKGROUND OF THE INVENTION

1. Field of the Invention

The present invention relates to electronic data transmission apparatus and, more particularly, to an improvement referred to generally as electronic half-tone generating apparatus for enabling a black and white facsimile transmission system to accurately and efficiently transmit and reproduce images including shades of gray as well as black and white.

2. Description of the Prior Art

Although photographic and other images containing gray scale information can very quickly, accurately and efficiently be transmitted using television apparatus, the transmission of such data over band-width limited or otherwise limited transmission media such as telephone lines and the like, is not a simple task since the data must first be modified in some fashion to accommodate the particular medium used.

Many types of machines are known in the prior art which optically scan a document, develop electrical signals corresponding to the content thereof, time compress or otherwise encode the data to improve its transmission speed and format, and then remotely receive the transmitted data and use it to reconstruct a facsimile of the original document. The equipment required to scan documents containing only black and white data and to transmit such information in either analog or digital form to a distant location for reconstruction is relatively simple, and through the use of sophisticated data compression techniques can be made highly efficient. However, where the document includes gray scale information, the techniques used and equipment required become much more complex, and normally the transmission costs go up substantially because of the time required to transmit the data.

For example, some prior art machines send gray scale information by modulating a carrier signal with information obtained by scanning the data in analog fashion. However, analog data is difficult to time compress and in systems where security encoding is required, it is difficult to scramble. Other devices quantize the data into dots and send several digital bits of information corresponding to each of the dots. This approach obviously requires the transmission of a large quantity of data. Still other systems transmit gray scale information by sending data in the form of alphabetical characters or other symbols that are gray scale weighed. However, in order to be efficient the data area covered by a character or symbol must be fairly large and as a result small picture detail is usually lost.

Another technique is to use a half-tone scanner to break up the data into discrete black and white dots and produce an image which can then be scanned to electronically produce digital data for transmission. Although this method is capable of producing a facsimile with very good detail, it requires the use of expensive half-toning equipment and is very time consuming.

SUMMARY OF THE PRESENT INVENTION

It is therefore a principal objective of the present invention to provide an improved means for enabling an ordinary facsimile transmission system to electronically modify gray scale analog data in such a way that it can be efficiently transmitted and in which an ordinary black and white printer can be used to reconstruct a facsimile of the original image.

Another object of the present invention is to provide an electronic subsystem which can be incorporated into a standard facsimile transmission system to enable it to transmit photographic information in a form which can be run-length encoded.

Another object of the present invention is to provide a means for transmitting gray scale picture information from a document that has not been previously reduced to half-tone copy.

Still another object of the present invention is to provide a means for electrically transforming analog data into a form which can be used to drive a black and white printer.

Still another object of the present invention is to provide an improved data transmission and reproduction system which utilizes ordinary document scanning techniques to develop electronic signals corresponding to an image to be transmitted, converts the data into a format that reduces the time required to transmit the data, and which then receives and reconverts the data back into a form that can be used to drive a black and white printer to produce an image having picture detail of reasonable quality.

Briefly, the present invention will be described in terms of three embodiments having varying degrees of complexity and document reproduction accuracy, namely, a mezzo system in which analog data is converted to binary form in a predetermined manner and transmitted for reproduction, a screened version in which the mezzo data is converted to a particular format for transmission, and a hybrid version in which mezzo system elements are used alternately with screened system elements to produce a reproduction having optimum picture quality.

An important advantage of the present invention is that it provides a means for enabling an ordinary facsimile system having standard analog scanning equipment and black/white picture reproduction equipment to produce a gray scale reproduction.

Another advantage of the present invention is that it provides a relatively simple means for modifying gray scale picture information so that it can be time compressed.

Still another advantage of the present invention is that it provides a relatively simple means for encoding or scrambling gray scale picture information.

These and other advantages of the present invention will no doubt become apparent to those of ordinary skill in the art after having read the following detailed description of the preferred embodiments which are illustrated in the several figures of the drawing.

IN THE DRAWING

FIG. 1 is a block diagram illustrating a facsimile transmission and reproduction system including an electronic half-tone generator circuit in accordance with the present invention;

FIG. 2 is a block diagram illustrating the principal components of the gamma correction circuit illustrated in FIG. 1;

FIGS. 3 and 4 are diagrams illustrating operation of the gamma correction circuit of FIG. 2;

FIG. 5 is a block diagram generally illustrating the principal components of the edge enhancement circuit shown in FIG. 1;

FIG. 6 is a timing diagram illustrating operation of the edge enhancement circuit shown in FIG. 1;

FIG. 7 is a block diagram generally illustrating the principal components of the data normalizer illustrated in FIG. 1;

FIG. 8 is a block diagram generally illustrating the principal components of the video-to-binary converter illustrated in FIG. 1;

FIG. 10 is a block diagram generally illustrating the principal components of a second embodiment of the present invention;

FIG. 11 is a diagram used to define various terms used in the specification;

FIG. 12 is a block diagram generally illustrating the principal components of the cell summation circuit and the format conversion circuit of the embodiment shown in FIG. 10;

FIG. 13 is a chart illustrating a set of transmit codes used in accordance with the present invention;

FIG. 14 is a chart illustrating a set of print codes used in accordance with the present invention;

FIG. 15 is a diagram used in explaining the operation of the circuit illustrated in FIG. 16;

FIG. 16 is a block diagram illustrating the principal components of a shifted screen data handling technique in accordance with the present invention;

FIG. 17 is a block diagram generally illustrating a third preferred embodiment of a facsimile reproduction system in accordance with the present invention;

FIG. 18 is a block diagram illustrating the principal components of the vertical and horizontal edge detector shown in FIG. 17;

DETAILED DESCRIPTION OF THE PREFERRED EMBODIMENTS

Figure 9:
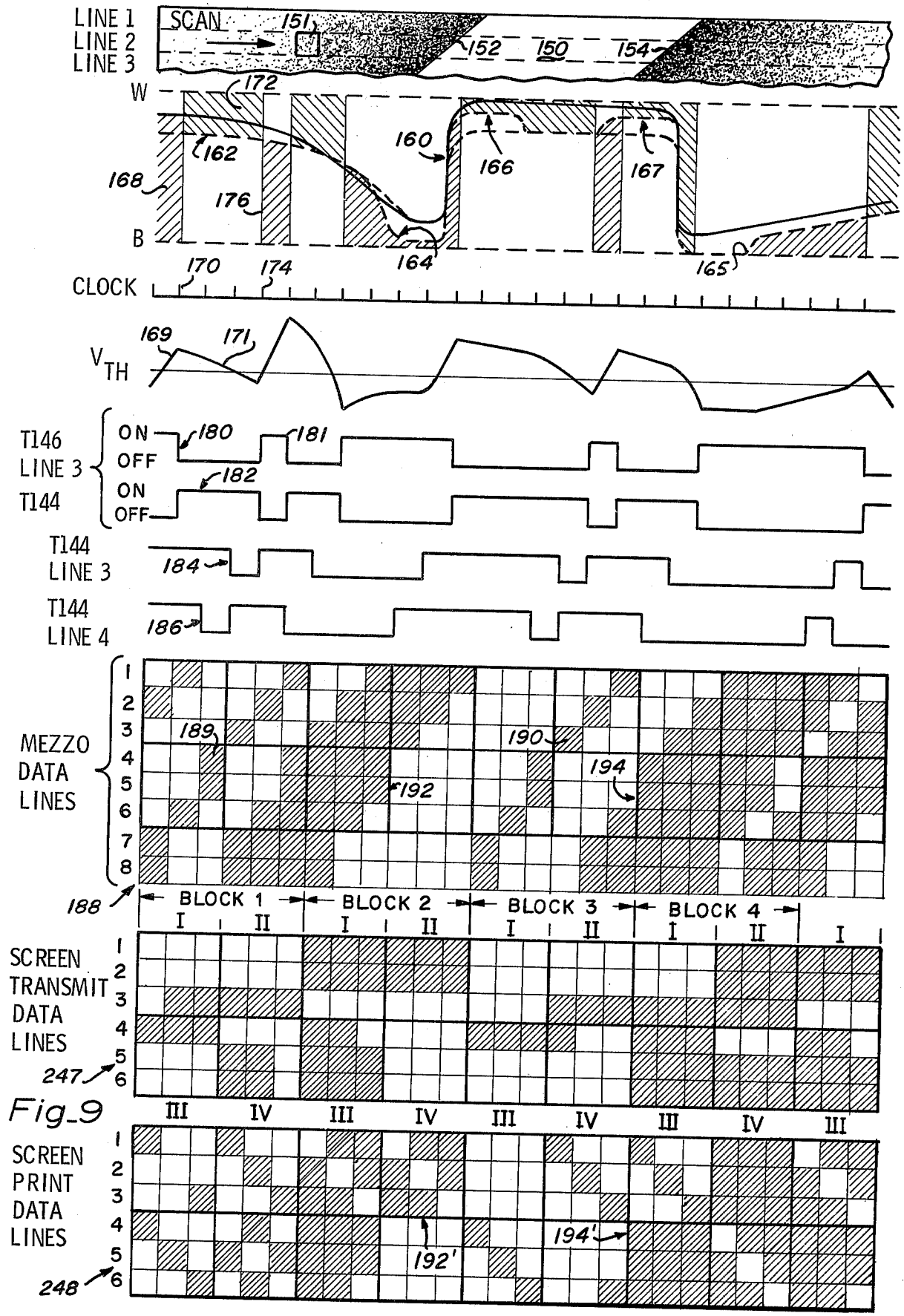
FIG. 9 is a diagram illustrating operation of the several embodiments of the present invention.

Referring now to FIG. 1 of the drawing, there is shown a block diagram illustrating the principal components of a facsimile reproduction system including a subsystem 10 in accordance with the present invention that will hereinafter be referred to as an electronic half tone generator or mezzo generator. Generally speaking, generator 10 includes a gamma correction circuit 12, an edge enhancement circuit 14, a data normalizing circuit 16, and a video-to-binary converter 18. The signal input to generator 10 is from a scanner 20 which is typically a photo-optical raster scanning device but may be of any other suitable configuration capable of scanning a document 21 containing alphanumeric graphics or pictorial information and generating a video (analog) signal on line 22 that corresponds to a raster scan thereof.

The output of generator 10 is selectively coupled either to a transmitter 24 or to a suitable data recorder 26 by means of a switching device 28. The transmitter generally shown at 24 is understood to include all necessary or desirable data compression components, line modulating components, modems and other equipment required to accommodate the particular type of transmission media used to convey the data. The recorder 26 may take the form of any suitable magnetic or other recording device capable of receiving binary digital signals, storing them temporarily and then outputting same to the transmitter 24 via line 32.

At the remote end of the transmission path 30, which may take the form of a microwave signal path, a light path, a telephone line, a radio connection, a satellite link, or any other communicative medium, is a receiver 34 capable of receiving the transmitted signal and converting it back into the original binary-digital form input to the transmitter 24. Coupled to the output of receiver 34 is a black/white printer 36 capable of responding to the binary-digital data to generate a facsimile 37 of the document 21. It will of course also be understood that the output of generator 10 or recorder 26 could be directly coupled to a black/white printer.

The purpose of the gamma correction circuit 12 included in generator 10 is to slightly modify the data received from scanner 20 so as to provide compensation where necessary or desirable for any scanner nonlinearities, printer deficiencies, or ocular nonlinearities so as to insure that the reproduced image fairly represents the scanned document. Although this may not in all cases be a necessary element of the device, it was found to be desirable in the preferred embodiment and was therefore included.

The principal components of circuit 12 are generally illustrated in FIG. 2 to include an amplifier 40 having a gain K1, a second amplifier 42 having a gain of K2, and a comparator 44. The output of the amplifiers are selectively connected to an output terminal 46 by means of a suitable switching device that is schematically illustrated at 48 and is controlled by the output of comparator 44. One input to comparator 44 is obtained from the output terminal 58 of amplifier 40 and a second input to comparator 44 is tied to a suitable reference voltage such that comparator 44 will transfer output 46 by means of switch 48 from amplifier 40 to amplifier 42 for output levels above $V_{REF}$. Amplifier 40 is a three-terminal device having one of its inputs 52 connected to input terminal 50 and a second input connected to circuit ground at 54. Amplifier 42 is also a three-terminal device having its first input 56 coupled to the output 58 of amplifier 40, and its second input 60 coupled to the above reference voltage which provides the offset necessary to accomplish the desired results to be explained below.

In FIG. 3 of the drawing, a nonlinear correction curve 64 is shown which is typical of the response of circuit 12. The output of the correction circuit is represented by the ordinate and the input signal received from scanner 20 is represented by the abcissa. From the curve it can be seen that input signals between 0 volts and 0.3 volts will be amplified at one gain, while input voltages between 0.3 volts and 1.3 volts will be amplified at a second gain. This response might, for example, correspond to the difference in the sensitivity of the human eye relative to the sensitivity of the scanner 20 and/or reproduction equipment (printer 36).

To further illustrate this operation, reference is also made to FIG. 4, wherein an arbitrarily drawn scanner output curve 70 is contrasted with a gamma corrected curve shown by the dashed line 72. Note that although the general shape of the curve is not changed, higher level signal variations are reduced in amplitude while lower level signal variations are increased in amplitude.

The edge enhancement circuit 14 is schematically illustrated by the block diagram shown in FIG. 5. The circuit includes first and second delay lines 80 and 82, first and second negative gain amplifiers 84 and 86, and a summing circuit 88. The amplifier 84 is coupled between the circuit input terminal 47 and one of the inputs 90 of the summing circuit 88, while the delay line 80, the delay line 82, and the amplifier 86 are all connected in series between the input terminal 47 and a second input 92 of circuit 88. The output 94 of delay line 80 is also connected to a third input 96 of circuit 88. Although the delay periods of lines 80 and 82 could be of any desired duration, in the preferred embodiment they were selected to be about 8 microseconds, which is approximately equivalent to the scan line length of one sample cell as will be explained below.

In FIG. 6, operation of the edge enhancement circuit is illustrated by a timing diagram showing the voltages developed at various circuit nodes in response to a stepped voltage input $V_{47}$. As illustrated, the negative gain amplifier 84 develops an inverted waveform $V_{90}$ of reduced amplitude at terminal 90, while delay line 80 causes a delayed voltage waveform $V_{96}$ to be applied to terminal 96, and delay lines 80 and 82 and amplifier 86 produce an inverted negative voltage $V_{92}$ at terminal 92. When the three voltages are combined by the summing circuit 88, the resultant voltage $V_\epsilon$ is developed at output terminal 97. The effect of the enhancement is to emphasize the voltages on either side of the edge 99. As will be described in more detail below, this will have the effect of causing edges in the reproduced image to appear sharper than would otherwise be the case. This feature is however only an element of refinement and need not necessarily form a part of generator 10.

The data normalizer 16 is shown schematically in FIG. 7 to include a variable gain amplifier 100 and a variable offset amplifier 102. Signal input to amplifier 100 is made via terminal 98 which is coupled to the output terminal 97 of the edge enhancement circuit previously described. A gain control input is applied at terminal 104. The output of amplifier 100 is fed directly into offset amplifier 102 at terminal 106. An offset control voltage is applied to amplifier 102 at terminal 108. The resultant normalized output is taken at terminal 109.

The input copy may have many desirable and/or undesirable characteristics. For example, it may have 1) high or low contrast, 2) generally light tones, 3) generally dark tones, and/or 4) low contrast objects of interest in a high contrast picture. Data normalizer 16 allows for operator (or automatic in some systems) adjustment of the picture contrast and/or general gray level in order to optimize the subjective appearance of the output copy or a portion of the output copy. In some cases the copy may be improved over the original by such adjustment. The gain control generally affects picture contrast and the offset control generally affects picture brightness or darkness.

A simplified version of the video-to-binary converter 18 is illustrated in FIG. 8 of the drawing and includes an input terminal 110, a voltage reference terminal 112 at which a black reference potential is applied, a voltage reference terminal 114 at which a white reference voltage is applied, an integrator 116, a comparator 118, and a flip-flop 120. Input terminal 110 is connected through a dropping resistor 122 to the input terminal 124 of integrator 116. The black reference terminal 112 is also connected through a dropping resistor 126 and a switch 128 to integrator input terminal 124. Similarly, the white reference terminal 114 is connected through a dropping resistor 130 and a switch 132 to integrator input terminal 124. The switches 128 and 132 are schematically shown as mechanical contact devices but in actuality are electronic devices actuated by electronic signals input thereto, as represented by the dashed lines 127 and 131, respectively.

Integrator 116 also has a second input terminal 134 for receiving a voltage reference signal. The output of integrator 116 is fed into one of two inputs 136 and 138 of comparator 118. The output of comparator 118 is coupled to the input 140 of flip-flop 120. Flip-flop 120 also receives a clocking signal at its input terminal 142. The output 144 of flip-flop 120 serves as the output of the converter and also controls switch 128, while the second output 146 is used to control the switch 132. By setting the black reference input at the black level voltage and by setting the white reference input at the white level voltage, and by setting the reference input to integrator 116 at one-half the difference between the white and black level voltages, it will be apparent that with switch 128 closed, the dropping resistors 122 and 126 will act as a voltage divider and the input to integrator 116 will be one-half the difference between the signal applied to terminal 116 and the black reference potential applied to terminal 112.

When the output of integrator 116 reaches a threshold level determined by the arbitrary reference voltage $V_{TH}$ applied to the terminal 138, comparator 118 will generate an output which causes flip-flop 120 to change state at the next clock time. This in turn causes switch 128 to open and switch 132 to close so that the white level reference voltage is input to integrator 116 along with the signal input. Integrator 116 will then begin to integrate the half difference between the curve and the white reference level. When the "white" integration reaches the threshold value of comparator 118, the comparator will generate an output which will cause flip-flop 120 to again change state at the next clock time. The output thus generated by flip-flop 120 on terminal 144 will be a binary-digital signal corresponding to the analog input signal. The polarities of the integrator and comparator are such that a positive signal developed on integrator input 124 causes output 136 to change in such a direction that comparator 118 will request a white decision from flip-flop 120 and close switch 128.

Turning now to FIG. 9 of the drawing, an example will be given to illustrate the operation of the electronic half-tone generator 10. In this example, the upper left hand corner of a document 150 is shown with dashed lines provided which are intended to be representative of three scan lines taken across that portion of the document. Although analog data is obtained during each scan of the document surface the data is interpreted on a periodic basis and as a result each scan line may be considered to be comprised of a series of picture elements 151. For illustrative purposes, the depicted portion of the document is shown white at the corner and then is shaded from white to black with a sharp transition from black to white occurring at 152 and then another sharp transition from white to black occurring at 154 followed by a black to white shading.

Illustrated immediately below the document portion 150, an output of the scanner taken along line 2 is shown by the solid line 160. This curve is however shown only by way of example and is scale related to the black and white levels illustrated. After gamma correction, the curve 160 is modified slightly so as to take the form illustrated by the dashed line 162. Line 162 is further modified by the edge enhancement circuit 14 to include enhancement perturbations at the image transition edges 152 and 154, these perturbations being in the form of signal dips 164 and 165, and rises 166 and 167. As illustrated, the curve 162 starts off near white and approaches black, with the enhancement dip 164 driving the curve further black as it approaches the edge 152. Similarly, as curve 162 approaches white at the transition, the enhancement rise 166 drives the curve further toward the white level, and a similar phenomena occurs at the transition 154.

If now we assume that initially the white switch 132 (see FIG. 8) is closed (146 in high state), integrator 116 will sum up the area 169 beneath curve 162 until the voltage developed on line 136 exceeds the reference potential applied to comparator 118 at input 138 as indicated at 169 on the integrator output curve shown at 171. At that time an output will be developed on line 140 for input to flip-flop 120. And upon occurrence of the next clock pulse 170 (see FIG. 9), flip-flop 120 will change state causing output terminal 144 to go high and output terminal 146 to go low thereby opening switch 132 and closing switch 128. Immediately beneath the integrator output curve 171 the output terminal states T144 and T146, which also correspond to the switching states of the black switch 128 and the white switch 132 respectively, are illustrated by the pulse trains 182 and 180. Integrator 116 will then integrate the area 172 which lies above curve 162 (actually a negative integral) until the total is reduced to the reference input to comparator 118 at which time comparator 118 will again change state on line 140 which, upon the occurrence of the next clock pulse 174 causes flip-flop 120 to change back to the black output state as indicated by pulse 181. At this time switch 132 again closes and switch 128 opens thereby causing the area 176 to be integrated (positive value as shown), etc., as the scanner makes it traverse over line 2. With the pulse train 180 representing the black positive output of the converter for line 2, a similar exercise can be used to develop the pulse trains 184 and 185 which respectively represent the outputs for lines 3 and 4. Assuming that the indicated shading of document portion 150 continues without change, data obtained in scanning the first 8 lines can be plotted as illustrated at 188 to illustrate the type of output that will be developed by generator 10 and reproduced by the black/white printer 36 (FIG. 1) after it has received the transmission.

Since printer 36 operates by printing dots of equal size following each clock pulse during which the output of generator 10 is high and since the line spacing is constant, it will be noted that the dots of adjacent lines tend to correlate and form more or less wavy lines (189, 190) which appear to extend in the direction generally transverse to the scan lines. This correlation of dots is known in the art as the mezzo effect. Although this technique produces accurate facsimile reproductions and gives very sharp definition between white and black transitions, as illustrated at 192 and 194, the visual effect created by the short wavy lines is undesirable for many applications. Another disadvantage of this particular method, at least insofar as transmission is concerned, is that it does not modify the data to provide for long run lengths of either black or white data which can be compressed in time to expedite transmission.

In FIG. 10 an improved system including a modified electronic half-tone generator 200, which will be referred to as a "screen cell generator", is illustrated. Instead of outputting data that corresponds to the scanned line on an element by element basis, the screen cell generator uses a technique wherein the data is grouped into blocks of data from which more easily transmitted signals may be developed that are representative of the data contained in each block.

In accordance with a preferred embodiment of this technique which is particularly suited for use in systems using a two-line data compression algorithm such as that disclosed in U.S. Pat. No. 3,916,095 to Weber et al, the scan data from six contiguous lines is in effect divided into blocks of four contiguous data cells, each of which contain data corresponding to a 3 × 3 array of "picture elements". One such block is illustrated in FIG. 11 and as shown is divided to form a square matrix of sixteen picture elements wherein each element is uniquely identified by row and column designations. As suggested above, the block is further subdivided into four cells I–IV, the purpose of which will be explained in detail below.

Returning now to FIG. 10, the screen cell generator 200 is shown to include all of the components included in the mezzo generator previously described, i.e., a gamma correction circuit 212, an edge enhancement circuit 214, a data normalizer 216 and a video-to-binary convertor 218, and in addition to include a cell summation circuit 220 and a format conversion circuit 222. And as in the transmission end of the FIG. 1 embodiment, data in analog form is fed into generator 200 by a scanning device 224 and the information output by generator 200 is transmitted by a transmitter 226, and is received by a receiver 228 disposed at a remote location. However, since the data is in the fact encoded by the format conversion circuit 222, a corresponding decoding circuit 230 must be included at the output of receiver 230 to decode the data and put it into a form suitable for driving the printer 232. Each of the components common to FIGS. 1 and 10 are substantially identical and since they have been previously described, their operation will not be again disclosed in detail.

In FIG. 12, a block diagram is shown illustrating the principal components of the screen cell summation circuit 220 and the format conversion circuit 222. As indicated, the circuit 220 is comprised of a binary counter 234 having a serial input terminal 235 and a four-bit parallel output illustrated at 236. The lines 236 are each fed into one element of a four scan line serial memory 238, the output of which is fed back into counter 234 via the lines 240. Memory 238 is a shift register capable of storing four lines of binary data with each line having a number of bits corresponding to the number of data cells along a scan line, i.e., the number of picture elements in a line divided by three.

Counter 234 and memory 238 are adapted to operate such that during the input of data corresponding to the first scan line, counter 234 will count the number of "black" bits of data in each three-bit series of data input thereto. Remember that in FIG. 11 a data cell was defined as being comprised of the nine bits of data corresponding to the three contiguous picture elements in each of three contiguous scan lines. The binary counts for each three bit series in the first line are sequentially input to memory 238. Upon receipt of all data corresponding to the first scan line, counter 234 will begin counting the black bits in each three bit series of the second scan line, except that prior to each counting operation the counter will be initialized via the shift register output on lines 240 to the count made with respect to the corresponding three bits in row one so that the count now fed into memory 238 is the sum of the black bits in the first and second three-bit series of each data cell. And similarly, as the data from the third scan line is received, counter 234 is again initialized so that it outputs during the third scan line a series of counts which correspond to the total number of black bits in each data cell of the first three scan lines. The counter is then reset to zero count prior to input of data from the fourth line (row 1 of the next group of cells) and the sequence is repeated for each subsequent three scan lines.

A close inspection of the operational technique of cell summation circuit 220 will indicate that its operation as previously described will in effect round off the data on a three picture element basis and thus introduce a slight short term error and resulting undesirable pattern into the processed data. This error, which could amount to up to one-half of a picture element per row, could be preserved by storing a remainder and adding it to the count of row two in the same cell, but this would require a substantial increase in the electronics needed for the circuit. The problem can, however, be alleviated by increasing the number of data samples taken along the three picture element row of the cell so that the percentage round off error for each cell row is reduced.

This can be accomplished by simply doubling, tripling, etc., the rate at which the video-to-binary converter 218 is clocked. If for example, the clock rate of converter 218 is doubled, there will be six bits of information across each cell row instead of three, and as a result the potential rounding error will be halved. In order to implement this alternate embodiment without affecting downstream components, the counter 234 and shift register 238 must be five-bit devices rather than four-bit devices but only the four most significant bits in the output of counter 236 will be input to the format conversion circuit 222 and only these four bits will be reset at the end of each count. As a result, the number input to circuit 222 will in effect be divided by two and thus, restore the cell size to nine bits. And by preserving the least significant bit in counter 234 the integrity of the summation operation will also be preserved.

The format conversion circuit 222 is essentially comprised of a eight-to-four multiplexer 242, a four-bit shift register 244 capable of storing the same quantity of four-bit numbers as does register 238, and a Read Only Memory (ROM) 246 which is programmed to contain a set of transmit codes having a particular combination of data bits corresponding to each of the ten possible counts that may be developed by summation circuit 220. Multiplexer 242 responds to an input at terminal 241 to either couple the data on lines 243 into shift register 244, or to recirculate the data flowing out of register 244 back into the register via lines 245. It will thus be appreciated that if multiplexer 242 is caused to couple data from circuit 220 into shift register 244 only during the output of data corresponding to each third scan line, only cell count numbers will be loaded into the register. And since at other times multiplexer 242 will recirculate the output of register 244 back into its input, it will be appreciated that each series of cell number data can be input to ROM 246 three times in series. Thus, by selectively addressing particular storage sites making up the four data cells selected by the number output from 244, three lines of screen cell data can be generated corresponding to each of the three scan lines of the scanned document.

It will be noted that during the time the encoded data corresponding to scan lines 1, 2 and 3 is being read out of the transmitter, scan data for lines 4, 5, and 6 is being fed into circuit 220 for processing. Accordingly, the only processing delay encountered in passing the data through circuits 220 and 222 is that time required to scan three lines of the document.

Referring now to FIG. 13 of the drawing, which is a diagram illustrating the four three-by-three arrays of data I–IV corresponding to each of the ten possible cell count numbers 0–9, it will be seen that by arranging the four cells for a given count number in the cell block positions indicated in FIG. 11, the data corresponding to each picture element of each cell is concentrated toward the center or outer extremities of the block. This will tend to cause the data output from ROM 246 to have longer run lengths of black and white data than would otherwise be the case if the data was not converted into the previously described transmit code. This, of course, makes it possible for transmitter 226 to compress the data to improve the transmission time and efficiency of the system.

It should also be pointed out, however, that this particular screen cell encoding scheme, i.e., wherein four contiguous cells of 3 × 3 elements each has been selected as particularly suited for use with a two line compression algorithm in the transmitter. Where any other multi-line algorithm is utilized a different encoding scheme and slightly different circuitry would be required.

An example illustrating the use of the transmit codes is given at 247 in FIG. 9 wherein the first four blocks of mezzo data shown at 188 are transformed into the corresponding transmit code cells. Note the improvement in run length for each line.

Upon receiving the transmit codes, the transmitter 226 makes the train of data suitable for transmission by further encoding, compressing, etc., and transmits the information to the receiver 228 which in turn converts it back into the transmit code form input to the transmitter. Format decoding circuit 230 then converts the transmit coded data back into a form suitable for driving printer 232 which, in the preferred embodiment is an ordinary black/white printer that prints a single black dot for each bit of black data input to it.

Circuit 230 is in structure almost identical to the circuit illustrated in FIG. 12 in that it includes the equivalent of both the cell summation circuit and the format conversion circuit. The principal difference is that the ROM contains only ten coded cells, i.e., print codes, of which one cell corresponds to each of the possible 0–9 cell block data counts. This, of course, means that the ROM addressing scheme will also be different than that for circuit 222 since there is only one print cell per count rather than four.

An example of a preferred set of print cells is illustrated in FIG. 14. As is apparent from the diagram, the aim is to spread the data in each cell over the area of the cell to the greatest extent possible and thereby provide somewhat of a randomization of the printed dots within the respective printed cells so as to prevent the objectionable correlation of dots occurring in the mezzo printout. An illustration of this intended result is given at 248 in FIG. 9 wherein the print code cells corresponding to each of the transmit code cells shown at 247 are reproduced. Even from this small sampling of data it is quite apparent that the dot correlation problem has been avoided and that the resulting facsimile will have an improved appearance as contrasted with the mezzo printout. It will, however, be noted that the edge (black/white transition) sharpness clearly apparent in the mezzo printout (at 192 and 194) is degraded somewhat in the screen cell printout, e.g., see 192' and 194'.

There are two ways in which the image printed out can be improved in appearance. One is to utilize a shifted screen technique in the format decoding circuit which predicts the actual distribution of dots within a particular cell based upon the dot content of adjacent cells. This is accomplished during the system decoding operation by selecting each particular print cell configuration on the basis of a combination of (a) the actual cell bit count X (see FIG. 15), (b) the bit count A of the immediately adjacent cell in the preceding cell row, and (c) the bit counts B and C of the immediately preceding and the immediately succeeding cells of the same cell row. Although not described herein, the selection of cell configuration could also take into account the adjacent cell D in the next cell row.

An embodiment of the format decoding circuit employing the shifted screen technique is illustrated in FIG. 16 of the drawing and includes a cell summation circuit 150 of the type illustrated in FIG. 12, a multiplexer 252, a shift register 254, a shift register 256, a binary subtraction circuit 258, a horizontal round-off ROM 260, a multiplexer 262, a shift register 264, a shift register 266, a binary subtraction circuit 268, a vertical round-off ROM 270 and a main decoding ROM 272. Multiplexer 252 is a suitable switching device which responds to a control signal on the line 253 to gate either the output of circuit 250 into shift register 254 or to recirculate the output of the register back into its input at 255. Shift register 254 is a four-bit parallel input device and is capable of containing all of the four-bit cell number words corresponding to three entire scan lines.

Shift register 256 is a four-bit parallel input parallel output device capable of receiving a series of three four-bit cell number words and outputting the three words in parallel on lines 257, 259 and 261, respectively. The subtraction circuit 258 is a device capable of subtracting the four-bit binary number C appearing on lines 257 from the four-bit binary number B appearing on lines 261, and developing a four bit difference output (B-C) on lines 263. ROM 260 is a device which is programmed to output one of several smaller numbers corresponding to several ranges of numbers within which the quantity (B-C) falls. For example, if (B-C) has a possible range of from −9 to +9 (bits per cell) this range might be divided into several sub-ranges so that instead of outputting the five-bit word required to cover the 19 possibilities of (B-C), it will output a three-bit word indicating various ones of seven sub-ranges of the five-bit word range. The effect of this operation is to in effect provide a rounding off in the horizontal direction of the data shift accomplished by this operation. It is entirely possible however that ROM 260 could be omitted and ROM 272 expanded to include a particular output for each of the 19 possible combinations (B-C). This would, however, substantially increase the size of ROM 272.

Multiplexer 262 is identical to multiplexer 252 and operates in response to an input on line 265 to either gate the output of shift register 254 into register 264 or to recirculate the output of register 264 back into its input. Shift register 264 is like register 254 a device capable of containing a number of four-bit words equivalent to the number of 3 × 3 cells forming a row of cells across the scanned page. Shift register 266 is a two-word four-bit serial device which is used to provide phasing between the output of register 264 and the positioning of data in register 256 so that when the four-bit word corresponding to position X in cell row two is output on lines 259, the four-bit word corresponding to cell A in cell row one appears on lines 267. Circuit 268 then subtracts word number X from word number A and develops an output on lines 269 which corresponds to the difference between the number of bits in cell A and cell X. There are also 19 possible numbers (A-X).

ROM 270 is programmed similar to ROM 260 to divide the possible 19 word range of (A-X) into a lesser number of sub-ranges and to output a corresponding three-bit number on lines 271 for input to ROM 272. In the preferred embodiment, ROM 270 divides the vertical range into three sub-ranges and ROM 260 divides the horizontal range into seven sub-ranges. The main decoding ROM 272 contains several sets of print codes similar to the code illustrated in FIG. 14 with each of the several sets of codes having its distribution of bits in the various cells modified in accordance with a table (not shown) designed to statistically approximate the actual distribution of data based upon the data of the adjacent cells. It will thus be appreciated that the data supplied to printer 232 for printing will more nearly approximate the data appearing on the scanned document than it normally would because this method tends to predict better, on the average, the original distribution of scanned elements (mezzo) that was lost in performing the screen cell summations. It will, however, also be appreciated that this technique like the screen technique will tend to make some sharp edges less sharp due to the statistical averaging employed to improve the overall distribution of data points. It may also, in some cases, make a less sharp edge more sharp and thereby enhance or distort the resulting printed image.

In order to combine the sharp edge capability of the mezzo technique and the more visually pleasant screen technique described above, a hybrid version of the electronic half-tone generator such as is illustrated at 300 in FIG. 17 may be employed. In this circuit generator 300 receives its input from a scanner 302 as in the previous embodiments, and outputs data to a transmitter 304 which in turn transmits data to a receiver 306 over a communication medium 305 for decoding by a special format decoding circuit 308 and printing by a printer 310. Generator 300 preferably but not necessarily includes a gamma correction circuit 312, an edge enhancement circuit 314, a data normalizing circuit 316 and a video-to-binary converter circuit 318, all of which are like those previously described. The output of converter 318 is coupled via line 319 to one input of a multiplexing device 320 which is schematically shown to include a pair of switches 321 and 322. A vertical and horizontal edge detector 323 is coupled to the output 303 of scanner 302 and serves to detect both vertical and horizontal edges encountered along each scan line; a vertical edge being defined as an edge normal to the scan line and a horizontal edge being defined as an edge parallel to the scan line. The output of detector 323, called vertical and horizontal flag signals, are coupled to the switch 322 of multiplexer 320 via line 325.

Referring briefly to FIG. 18, a simplified block diagram of one embodiment of the detector 323 is depicted to include a differentiator 330 and a pair of threshold detectors 332 and 334 which serve as the vertical edge detecting component 335, and an analog line store 336, an analog subtracter circuit 338 and a pair of threshold detectors 340 and 342 which collectively serve as the horizontal edge detecting component 343. Differentiator 330 will differentiate the analog output of scanner 302 and develop output pulses having amplitudes proportional to the rate of transition of the data from black-to-white or white-to-black. Detectors 332 and 334 are in effect comparators having one input set to a reference potential that is selected to identify the occurrence of an edge changing from either black-to-white or white-to-black respectively as determined by the magnitude of the output of differentiator 330 on line 331. Any output developed by detectors 332 or 334 is output through OR gate 344 to line 325 to develop a vertical flag signal.

The output of scanner 302 is also applied to the input of analog line store 336 and to one input 339 of the analog subtracting circuit 338. Line store 336 has the effect of delaying the output of scanner 302 so that during the time a given scan signal is being input to subtractor 338, the analog signal corresponding to the preceding line is also being synchronously input on line 337 to subtractor 338. It will thus be apparent that the output of subtractor 338 on line 341 will correspond to the difference in shading between any two scan lines, and the comparators 340 and 342 can, by having appropriate positive and negative reference signals applied thereto, develop outputs which will indicate the occurrence of a horizontal transition. These outputs are then output through OR gate 344 to line 325 to develop a horizontal flag signal.

Returning again to FIG. 17, the digital mezzo data output by converter 318 is fed through multiplexer 320 and into one of the digital storage units 347 and 348 through write/select logic 345 and 346, and is subsequently read out therefrom by read/select logic 349 for input to a transmit formatter 350 where it is scrambled for reasons which will be explained below. The scrambled mezzo is then input to a mezzo-to-screen converter 351 which develops screen cell information in the manner described above.

The vertial and horizontal flag signals developed by detector 323 are input through multiplexer 320 to flag store RAMs 366 and 368 contained in storage units 347 and 348 and are read out therefrom onto a line 367 for input to delay line 353. RAMs 366 and 368 are each one line storage devices into which the flag signals of the corresponding three scan lines are ORed. The output of delay line 353 is used to select either the delayed scrambled mezzo data at terminal 355 or the screen cell data at terminal 357 for input to transmitter 304.

In addition to the flag store RAMS 366 and 368 the data storage units 347 and 348 also include RAMS 354–358 and 360–364, respectively, each of which store the binary data developed in scanning consecutive scan lines. The reason for having six separate RAMS is to permit data to be read into a first set of three and then be read out therefrom during the time that the next three lines of data are being stored in the other set of three RAMS. Three lines of data must be simultaneously read into transmit formatter 350 in order to perform the scrambling operation which makes it possible to ultimately decode the scrambled mezzo and the screen code data that has been intermixed in the absence of identifying data.

Figure 19:
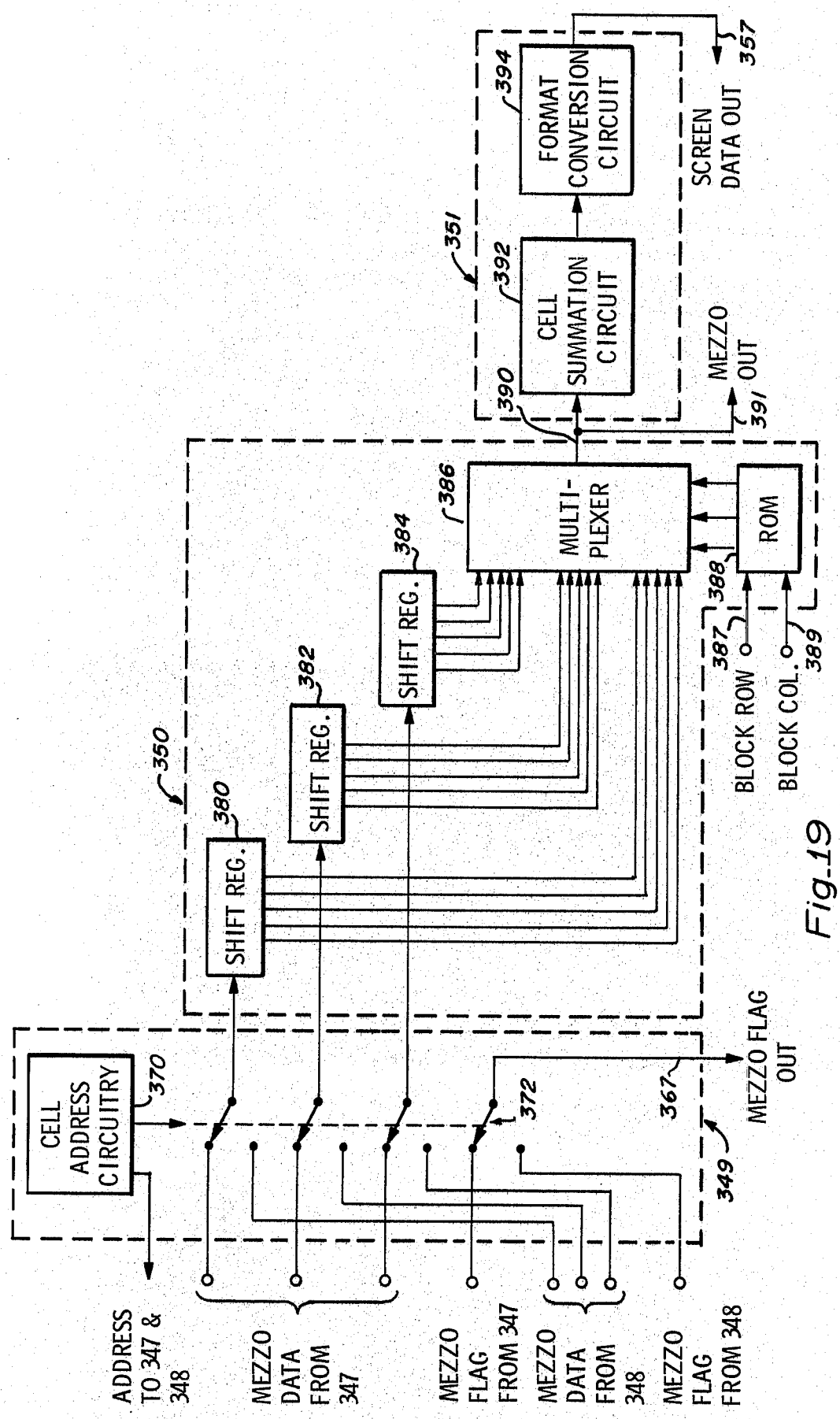
FIG. 19 is a diagram further illustrating certain components of the circuit shown in FIG. 17.

In FIG. 19 the operative components of logic 349, formatter 350, and converter 351 are schematically illustrated. As indicated, logic 349 includes cell address and switching circuitry which functions to address those bits of data in store 347 or data in store 348 which correspond to a particular data cell to be processed. Circuitry 370 also selects the corresponding flag signal for output on line 367. Formatter 350, which is in essence a data scrambling circuit, includes three five-bit series-to-parallel shift registers 380, 382, and 384, the parallel outputs of which are fed into a multiplexer 386.

The ROM 388 is programmed to cause multiplexer 386 to select one of the fifteen lines input thereto for each row and column combination input on lines 387 and 389. One example of a transformation code of the type which might be stored in ROM 388 is given in FIG. 20. The illustrated diagram 391 represents the thirty-six picture elements of four contiguous cells which are grouped together to form a block of cells. Each element lies within a particular row and column of the block and is identified within its cell by a number of from one to nine. The corresponding transformation code is shown at 393. Note the arrangement of elements in each cell is the mirror image of that in the adjacent cell. This renders the code consistent with the screen code illustrated in FIG. 13.

According to the illustrated code, instead of reading out the data corresponding to elements 1, 2, 3 (Cell No. I), 1, 2, 3 (Cell No. II) etc., during the first output line, ROM 388 causes multiplexer 386 to read out the data contained in element positions 3, 2 and 8 of Cell I, then 8, 2 and 3 of Cell II, etc. such that the data corresponding to each cell is in effect transformed to a different predetermined location in the same cell of the transformed block of the cells.

Figure 20:
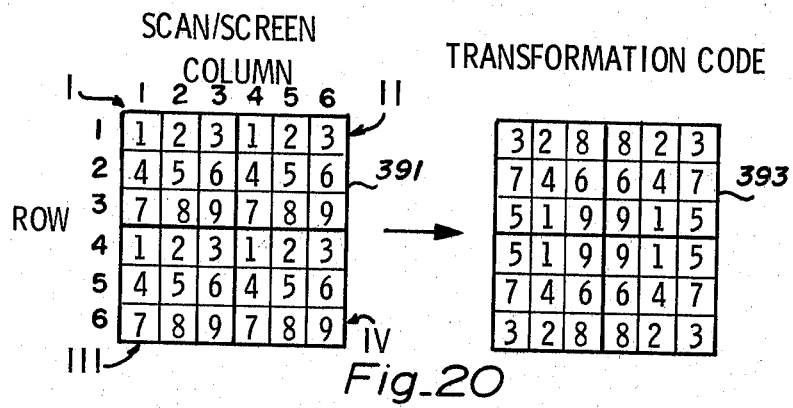
FIGS. 20 and 21 are diagrams used to illustrate operation of the embodiments illustrated in FIG. 17.

Returning now to FIG. 19, it will be appreciated that with the switches 372 in the position shown, the data in RAMS 354–358 can be read directly into shift registers 380–384, respectively, and once the nine bits corresponding to a particular cell are contained in the first three positions of each register, ROM 388 can be addressed to cause multiplexer 386 to read out the bit of data contained within that cell which corresponds according to the transformation code to the first bit position, i.e., as per FIG. 20, the first bit to be read out is the data contained in position 1 of register 380, i.e., element 3. The data is then shifted one position forward in registers 380–384 and the next bit read out is that stored in the third position of register 380, i.e., element 2. The data is then again shifted one more position through registers 380–384 and the third bit read out is that contained in the fourth position of register 384, i.e., element 8, etc. until the entire first line of mezzo data is transformed into (3,2,8) (8,2,3) . . . where the brackets separate cells and the numbers identify the binary information transmitted by element position in the cell.

The same data is then again input to registers 380–384 from store 347 and the second line of transformed data is read out in the above described fashion to produce (7,4,6) (6,4,7) . . . followed by a third input of the data from store 347 to shift register 380–384 and a reading out of the transformed data for the third line, etc.

Once the third line has been read out, cell address circuitry 370 causes the switches 372 to flip to their lower position so that the same process can be followed to read out the data contained in store 348. During the time that the data contained in store 348 is being transformed by circuit 350, the mezzo data corresponding to lines 7, 8 and 9 is being read into the RAMS 354–358, respectively. The operation would thus continue until all of the data corresponding to the scanned document was read out on line 391 as well as into converter 351.

Converter 351 includes a cell summation circuit 392 and format conversion circuit 394 which are substantially identical to those like components illustrated in FIG. 12 and serve to develop screen data on line 357. Note that since cell integrity is preserved even though the data contained in each cell has been transformed (scrambled), the screen data output is identical to that which would have been output had the unscrambled mezzo been input thereto. The reason for this is of course that the screen data is determined solely by the number of black (or alternatively the white) data bits contained within a particular cell independent of their location within the cell.

Returning again to FIG. 17 and remembering the operation of converter 351 from the earlier discussion of FIG. 12, it will be noted that the screen data output on line 357 is delayed four lines relative to the scrambled mezzo input thereto from formatter 350. Accordingly, the four line delay circuit 352 must be incorporated in line 391 so that the scrambled mezzo data appearing at terminal 355 is coincident with the corresponding data appearing at terminal 357. The horizontal and vertical flag signals developed on line 367 are also appropriately delayed by a delay means 353 and used to control the switch 397 (actually a multiplexing circuit in practice) in such a manner that when no flag is raised, switch 397 is in the position illustrated and screen data is input to transmitter 304, but when either a vertical or horizontal flag is raised, switch 397 is caused to contact terminal 355 and scrambled mezzo data is input to transmitter 304. Note that the result of this operation is that the screen data and the scrambled mezzo are fed into transmitter 304 in a continuous screen of series data with no identifying bits of data required insofar as the cells are concerned. Transmitter 304 then functions in the normal manner to transmit the data to receiver 306 via the communication medium 305.

Figure 22:
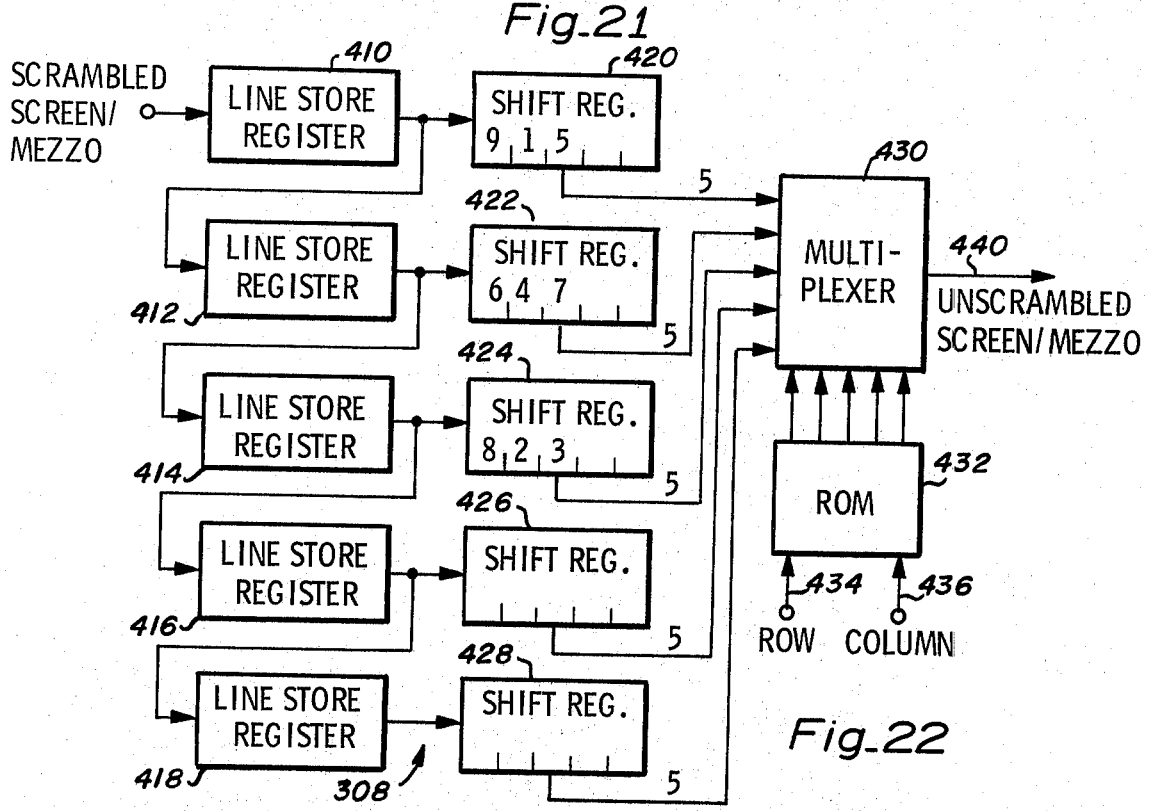
FIG. 22 is a block diagram illustrating the principal components of the format decoding circuit shown in FIG. 17.

The format decoding circuit 308 differs from that previously described for the screen cell embodiment because an inverse transformation relative to that performed by formatter 350 must be effected. An example of a circuit capable of performing such decoding operation is illustrated in FIG. 22 and includes a series of line store serial shift registers 410–418 connected in series and five, five-bit series-to-parallel shift registers 420–428 having their inputs respectively coupled to the outputs of registers 410–418 and their five parallel outputs coupled to the input terminals of a 25 × 1 multiplexer 430. Multiplexer 430 is controlled by a ROM 432 which is programmed to select various bits of data contained within the registers 420–428 in response to row and column inputs applied at 434 and 436, respectively.

Prior to any output being selected by ROM 432, the first line of transmitted data must be input through registers 410 and 412 into register 414, the second line of transmitted data must be input through register 410 to register 412, and the third line of transmitted data must be input to register 410. Once such data is contained in registers 410, 412 and 414, three bits in each register may be shifted out and into the first three positions of the five-bit registers 420–424 and ROM 432 can be supplied with an address which will cause it to in turn cause multiplexer 430 to read out one of the nine bits contained in registers 420–424. Pursuant to the transformation code shown in FIG. 20, it can be shown that the first 3 storage positions of the registers 420–424 will respectively contain the data (9,1,5), (6,4,7) and (8,2,3) where the numbers identify the cell element positions. Accordingly, the first bit to be read out would be that contained in the second position of register 420, the second bit to be read out would be that contained in the third position of register 424 (remember the shift), the third bit to be read out would be that contained in the fifth position of register 424 (another shift), etc. This operation will be continued with data being shifted through all the registers and with data being selected from registers 420–424 until the entire first line is decoded and read out.

At this time the data contained in the first three transmitted lines is contained in registers 416, 414, and 412, respectively with the data pertaining to the fourth transmitted line being contained in register 410. In order to read out the second line, the data contained in the registers 412–416 is read into the registers 422–426, respectively, and ROM 432 causes the appropriate data elements to be read out therefrom for print line 2. When the decoding of print line 2 is completed, all data in the first three lines will be contained in registers 418, 416, and 414, respectively, with the transmitted line 4 data being contained in registers 412, and the transmitted line 5 data contained in register 410. ROM 432 must therefore cause multiplexer 430 to address information shifted into registers 424–428 in order to decode and read out line 3.

Upon completion of the read out of print line 3, it will be noted that transmit line 4 data is in register 414, transmit line 5 data is in register 412, and transmit line 6 data is in register 410. This data can then be read into the registers 420–424 and multiplexer 430 can be caused to address information contained therein in order to decode print line 4, etc. The above operation will thus continue until the entire series of transmit data is decoded and input to printer 310.

Figure 21:
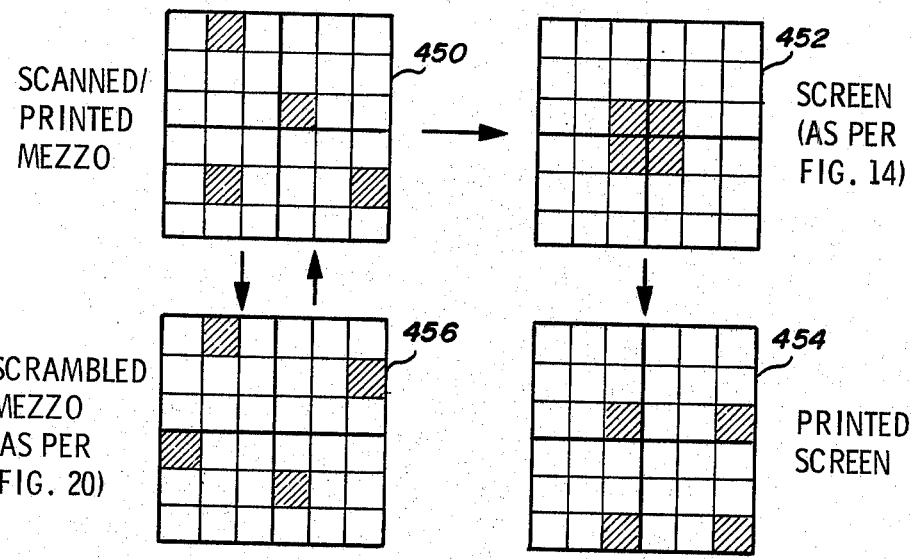

Examples of what the scrambled mezzo and screen cell data look like after being decoded in this fashion are illustrated in FIG. 21 wherein at 450 a block of data as scanned is illustrated. Note that in each cell of the block, one bit of black data appears but in each cell the bit is in a different one of the 9 element positions. At 452, a corresponding block of screen cell data is illustrated transformed as per the screen transmit codes illustrated in FIG. 13, and at 454, the decoded and printed screen data is illustrated, decoded as per the print codes shown in FIG. 14. At 456, the scanned mezzo is shown scrambled pursuant to the transformation code illustrated in FIG. 20 and the reverse transformation or printed mezzo is represented by the original data shown at 450. Note that although the four cells of data were transformed using two different encoding schemes, after decoding, the number of black elements in each cell remains the same and that the mezzo output is substantially as scanned while the printed screen data is rearranged within the respective four cells of the block.

Remembering that in this embodiment the mezzo data is only transmitted at an edge and that the screen data is transmitted at all other times, by again referring to FIG. 9 it can be appreciated that the edge sharpness shown at 192 and 194 will appear in the printout, while the more realistic dispersion of shading dots in the gray scale areas will appear over all non-edge portions of the printout and such portions will be free of the regular wavy line appearance caused by the correlation of dots in the mezzo data.

In order to simplify the description of the present invention, the several embodiments have been described above with reference to generalized block diagrams which are believed to be representative of the operative function of those embodiments. It is to be understood, however, that the invention described could be implemented in numerous different ways which would be apparent to those skilled in the art after having read the above disclosure. Accordingly, it is intended that the appended claims be interpreted as covering all implementations reasonably flowing from this disclosure and following within the true spirit and scope of the invention.

What is claimed is:

1. In a facsimile reproduction system including means for scanning perceptible information on a line-by-line basis and for generating analog signals corresponding thereto, means for converting the analog signals to binary signals, means for transmitting the binary signals to a remote receiving station where the signals are used to drive a printer which reproduces a copy of the scanned information, an improved means for converting the analog signals to binary signals comprising:
   means providing a first reference potential representing one analog signal state;
   means providing a second reference potential representing another analog signal state;
   integrating means responsive to a first data signal and operative to integrate the difference between an input analog signal and said first reference potential and to develop a first integral signal commensurate therewith, and responsive to a second data signal and operative to integrate the difference between the input analog signal and said second reference signal and to develop a second integral signal commensurate therewith;
   comparator means responsive to said first and second integral signals and operative to develop a comparison signal when said first or second integral signals exceed a predetermined threshold value; and
   signal generating means responsive to said comparsion signal and operative to develop said first data signal upon each odd numbered occurrence of said comparison signal and to develop said second data signal upon each even numbered occurrence of said comparison signal, said first data signal comprising a series of data bits corresponding to each scan line of the analog signals, each said data bit identifying the data state of a discrete elemental area of the scanned information.

2. In a facsimile reproduction system as recited in claim 1 wherein said means for converting further comprises a gamma correction circuit interposed in the signal path between the scanner and said integrator, said gamma correction circuit including means for causing said analog signal to be modified in a predetermined nonlinear fashion to compensate for certain predetermined system nonlinearities or the like before it is input to said integrator.

3. In a facsimile reproduction system as recited in claim 2 wherein said means for converting further comprises an edge enhancement circuit interposed in the signal path between said gamma correction circuit and said integrator, said edge enhancement circuit including means for modifying the gamma corrected analog signal during a short period prior to and during a short period following a rapid change in the amplitude of said analog signal so as to accentuate the data on each side of the change.

4. In a facsimile reproduction system as recited in claim 3 wherein said means for converting further comprises a data normalizing circuit interposed in the signal path between said enhancement circuit and said converter circuit, said normalizing circuit including means for modifying the gain and offset of said analog signal so as to maintain a constant interrelationship with a particular set of reference levels.

5. In a facsimile reproduction system as recited in claim 1 wherein said means for converting further comprises:
   a cell summation means for counting the number of data bits of a first state in each cell of a group of cells containing the scanned information, a cell being defined as a block of X data bits consisting of $m$ corresponding data bits in each of $n$ lines of scanned data where X, $m$ and $n$ are integers and where $X = m \times n$, and for developing a series of binary words identifying the number of data bits of said first state in each said cell; and
   a format conversion means which used said binary words to develop a series of screen data bits having a predetermined relationship to the data bits in each said cell.

6. In a facsimile reproduction system as recited in claim 5 wherein said cell summation means includes a count storage means, and a counter means for counting the number of data bits of said first state in each series of $m$ bits corresponding to a first scan line and storing each such count in said count storage means until all data corresponding to said first scan line is counted, means for initializing said counter means to each first scan line count contained in said storage means so that said counter means will, upon input of data corresponding to the second scan line, develop a series of new counts corresponding to the number of data bits of said first state in each corresponding series of $m$ bits of the data of said first and second scan lines, and storing said new counts in said storage means, said initializing means then repeating the above-described operation until the data bits of $n$ scan lines are counted by said counter means, the counts made during the $n^{th}$ line providing said binary words identifying the data bits of said first state in each said cell.

7. In a facsimile reproduction system as recited in claim 5 wherein said format conversion means includes a memory device programmed to contain a set of screen cell codes which can be addressed by said binary words and caused to read out one screen data bit corresponding to each scanned elemental area, the screen data bits corresponding to a particular cell having a number of data bits of said first state determined by the corresponding binary word, said screen data bits being arranged in a predetermined manner within the cell.

8. In a facsimile reproduction system as recited in claim 5 and further including an improved receiving station comprising a format decoding means for converting the transmitted and received screen data bits into print coded data bits selected from a set of print cell codes corresponding to said screen cell codes.

9. In a facsimile reproduction system as recited in claim 8 wherein said format decoding means includes another cell summation means for counting the number of data bits of said first state in each screen data cell, and for developing a series of print binary words identifying the number of data bits of said first state in each said screen data cell, and a print format conversion means which uses said print binary words to develop a series of print data bits having predetermined relationships to the data bits in each corresponding screen data.

10. In a facsimile reproduction system as recited in claim 9 wherein said print format conversion means includes a memory device programmed to contain a set of print cell encoded data which can be addressed by said print binary words and caused to read out print data bits corresponding to each scanned elemental area.

11. In a facsimile reproduction system as recited in claim 9 wherein said print format conversion means includes means for comparing each said print binary word to the corresponding print binary word of a previous row of cells and to the print binary words of the immediately preceding and succeeding print binary words in order to develop a shifted screen print word, and a memory device programmed to contain a set of print cell encoded data which can be addressed by said shifted print screen words and caused to read out shifted print data bits corresponding to each scanned elemental area.

12. In a facsimile reproduction system as recited in claim 1 and further comprising:
means for storing the first $n$ scan lines of said first data signal and means for storing the second $n$ scan lines of said first data signal;
a transmit formatter means for simultaneously receiving the first $m$ bits of said first $n$ scan lines of data and for selecting bits from such $m \times n$ array of bits in a series determined by a predetermined transformation code to develop a scrambled mezzo output signal;
a converter means for counting the number of data bits of a first state in each cell of a group cells corresponding to particular areas of said scanned information, an $n$ cell being defined as a block of $X$ data bits consisting of $m$ corresponding data bits in each of $n$ lines of said scrambled mezzo data where $X$, $m$ and $n$ are integers and $X = m \times n$, and for developing a series of binary words identifying the number of data bits of said first state in each said cell;
a format conversion means which uses said binary words to develop a series of screen data bits having each a predetermined relationship to the data bits in each said cell;
edge detecting means responsive to said input analog signal and operative to detect vertical and horizontal edges in the scanned information and to generate flag signals commensurate therewith; and
means responsive to said flag signals and operative to cause said mezzo data bits to be input to the transmitting means when an edge is detected and said screen data bits to be input to said transmitting means when no edge is detected.

13. In a facsimile reproduction system as recited in claim 12 wherein said edge detector means includes differentiating means for differentiating the input analog signals to develop positive going or negative signals having amplitudes proportional to the change in data state of the scanned information, and threshold detector means for developing a vertical flag signal when the level of said positive or negative going signals exceed predetermined threshold values; and
means for comparing the present analog line signal to the immediately preceding analog line signal to develop a difference signal proportional to any difference therebetween, and threshold detecting means responsive to the amplitude of said difference signal and operative to develop a horizontal flag signal when the level of said difference signal exceeds a predetermined threshold.

14. In a facsimile reproduction system as recited in claim 12 wherein said transmit formatter means includes $n$ series-to-parallel shift registers with the input of each being connectable to one of said first or second scan line storage means, a multiplexing means having a set of terminals connected to the parallel outputs of said shift registers and a memory means for selecting one of said parallel outputs each time a particular combination of row and column signals are input thereto, whereby a stream of mezzo data scrambled in accordance with a predetermined transformation code is developed by said transmit formatting means.

15. An electronic half-tone generator means for converting an analog input signal to a digital output signal, comprising:
means providing a first reference potential representing one analog signal state;
means providing a second reference potential representing another analog signal state;
integrating means responsive to a first data signal and operative to integrate the difference between an input analog signal and said first reference potential and to develop a first integral signal commensurate therewith, and responsive to a second data signal and operative to integrate the difference between the input analog signal and said second reference signal and to develop a second integral signal commensurate therewith;
comparator means responsive to said first and second integral signals and operative to develop a comparison signal when said first or second integral signals exceed a predetermined threshold value; and
signal generating means responsive to said comparison signal and operative to develop said first data signal upon each odd numbered occurrence of said comparison signal and to develop said second data signal upon each even numbered occurrence of said comparison signal, said first data signal comprising a series of data bits corresponding to each scan line of the analog signals, each said data bit identifying the data state of a discrete elemental area of the scanned information.

16. An electronic half-tone generator means as recited in claim 15 wherein said means for converting further comprises a gamma correction circuit interposed in the signal path between the scanner and said integrator, said gamma correction circuit including means for causing said analog signal to be modified in a predetermined nonlinear fashion to compensate for certain predetermined system nonlinearities or the like before it is input to said integrator.

17. An electronic half-tone generator means as recited in claim 16 wherein said means for converting further comprises an edge enhancement circuit interposed in the signal path between said gamma correction circuit and said integrator, said edge enhancement circuit including means for modifying the gamma corrected analog signal during a short period prior to and during a short period following a rapid change in the amplitude of said analog signal so as to accentuate the data on each side of the change.

18. An electronic half-tone generator means as recited in claim 17 wherein said means for converting further comprises a data normalizing circuit interposed in the signal path between said enhancement circuit and said converter circuit, said normalizing circuit including means for modifying the gain and offset of said analog signal so as to maintain a constant interrelationship with a particular set of reference levels.

19. An electronic half-tone generator means as recited in claim 15 wherein said means for converting further comprises:
   a cell summation means for counting the number of data bits of a first state in each cell of a group of cells containing the scanned information, a cell being defined as a block of X data bits consisting of $m$ corresponding data bits in each of $n$ lines of scanned data where X, $m$ and $n$ are integers and where $X = m \times n$, and for developing a series of binary words identifying the number of data bits of said first state in each said cell; and
   a format conversion means which uses said binary words to develop a series of screen data bits having a predetermined relationship to the data bits in each said cell.

20. An electronic half-tone generator means as recited in claim 19 wherein said cell summation means includes a count storage means, and a counter means for counting the number of data bits of said first state in each series of $m$ bits corresponding to a first scan line and storing each such count in said count storage means until all data corresponding to said first scan line is counted, means for initializing said counter means to each first scan line count contained in said storage means so that said counter means will, upon input of data corresponding to the second scan line, develop a series of new counts corresponding to the number of data bits of said first state in each corresponding series of $m$ bits of the data of said first and second scan lines, and storing said new counts in said storage means, said initializing means then repeating the above-described operation until the data bits of $n$ scan lines are counted by said counter means, the counts made during the $n^{th}$ line providing said binary words identifying the data bits of said first state in each said cell.

21. An electronic half-tone generator means as recited in claim 19 wherein said format conversion means includes a memory device programmed to contain a set of screen cell codes which can be addressed by said binary words and caused to read out one screen data bit corresponding to each scanned elemental area, the screen data bits corresponding to a particular cell having a number of data bits of said first state determined by the corresponding binary word, said screen data bits being arranged in a predetermined manner within the cell.

22. An electronic half-tone generator means as recited in claim 15 and further comprising:
   means for storing the first $n$ scan lines of said first data signal and means for storing the second $n$ scan lines of said first data signal;
   a transmit formatter means for simultaneously receiving the first $m$ bits of said first $n$ scan lines of data and for selecting bits from such $m \times n$ array of bits in a series determined by a predetermined transformation code to develop a scrambled mezzo output signal;
   a converter means for counting the number of data bits of a first state in each cell of a group of cells corresponding to particular areas of said scanned information, an $n$ cell being defined as a block of X data bits consisting of $m$ corresponding data bits in each of $n$ lines of said scrambled mezzo data where X, $m$ and $n$ are integers and $X = m \times n$, and for developing a series of binary words identifying the number of data bits of said first state in each said cell;
   a format conversion means which uses said binary words to develop a series of screen data bits having each a predetermined relationship to the data bits in each said cell;
   edge detecting means responsive to said input analog signal and operative to detect vertical and horizontal edges in the scanned information and to generate flag signals commensurate therewith; and
   means responsive to said flag signals and operative to cause said mezzo data bits to be input to the transmitting means when an edge is detected and said screen data bits to be input to said transmitting means when no edge is detected.

23. An electronic half-tone generator means as recited in claim 22 wherein said edge detector means includes differentiating means for differentiating the input analog signals to develop positive going or negative signals having amplitudes proportional to the change in data state of the scanned information, and threshold detector means for developing a vertical flag signal when the level of said positive or negative going signals exceed predetermined threshold values; and
   means for comparing the present analog line signal to the immediately preceding analog line signal to develop a difference signal proportional to any difference therebetween, and threshold detecting means responsive to the amplitude of said difference signal and operative to develop a horizontal flag signal when the level of said difference signal exceeds a predetermined threshold.

24. An electronic half-tone generator means as recited in claim 22 wherein said transmit formatter means includes $n$ series-to-parallel shift registers with the input of each being connectable to one of said first or second scan line storage means, a multiplexing means having a set of terminals connected to the parallel outputs of said shift registers and a memory means for selecting one of said parallel outputs each time a particular combination of row and column signals are input thereto, whereby a stream of mezzo data scrambled in accordance with a predetermined transformation code is developed by said transmit formatting means.

* * * * *